(12) United States Patent
Sandbote

(10) Patent No.: US 7,729,302 B2
(45) Date of Patent: Jun. 1, 2010

(54) ADAPTIVE CONTROL OF MULTIPLEXED INPUT BUFFER CHANNELS

(75) Inventor: Sam B. Sandbote, Reston, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 3877 days.

(21) Appl. No.: 09/859,150

(22) Filed: May 15, 2001

(65) Prior Publication Data
US 2002/0172156 A1 Nov. 21, 2002

(51) Int. Cl.
*H04B 7/204* (2006.01)

(52) U.S. Cl. ............... 370/319; 370/230; 370/412; 370/413; 370/414; 370/419

(58) Field of Classification Search ........... 370/429, 370/412–414, 418–419, 230
See application file for complete search history.

(56) References Cited

U.S. PATENT DOCUMENTS

| | | | | |
|---|---|---|---|---|
| 5,517,495 A | * | 5/1996 | Lund et al. | 370/399 |
| 5,649,110 A | * | 7/1997 | Ben-Nun et al. | 370/351 |
| 5,675,573 A | * | 10/1997 | Karol et al. | 370/230 |
| 6,101,193 A | * | 8/2000 | Ohba | 370/429 |
| 6,188,690 B1 | * | 2/2001 | Holden et al. | 370/390 |
| 6,247,058 B1 | * | 6/2001 | Miller et al. | 709/234 |
| 6,483,841 B1 | * | 11/2002 | Chang et al. | 370/412 |
| 6,654,345 B1 | * | 11/2003 | Chiussi et al. | 370/231 |
| 6,778,536 B1 | * | 8/2004 | Ofek et al. | 370/395.4 |
| 6,785,290 B1 | * | 8/2004 | Fujisawa et al. | 370/419 |

OTHER PUBLICATIONS

"Utopia Level 2, Version 1.0," Jun. 1995, provided by the ATM Forum.
"Utopia 3 Physical Layer Interface," Nov. 1999, provided by the ATM Forum.
"POS-PHY, Saturn Compatible Packet Ove Sonet Interface Specification for Physical Layer Devices (Level 2)," Dec. 1998, provided by the Saturn Group, PMC-Sierra.

* cited by examiner

*Primary Examiner*—Patrick N Edouard
*Assistant Examiner*—Wayne Cai
(74) *Attorney, Agent, or Firm*—Sterne, Kessler, Goldstein & Fox PLLC

(57) ABSTRACT

The present invention is a technique to select an input port. A database stores records of input ports for a plurality of communication channels. Each of the records includes a timestamp and a ready status. The timestamp indicates a most recent service time. A selector selects one of the input ports based on the timestamp and the ready status. A listener updates the records.

35 Claims, 4 Drawing Sheets

ADAPTIVE CONTROL OF MULTIPLEXED INPUT BUFFER CHANNELS

BACKGROUND

1. Field of the Invention

This invention relates to digital communication. In particular, the invention relates to channel multiplexing.

2. Background of the Invention

A typical communication system has a number of input ports on a bandwidth aggregator. These input ports receive information from a number of sources at different data rates from low bandwidth communication channels. The data are stored in buffers (e.g., first in first out) having appropriate depth. Data from the buffers are then multiplexed by a multiplexing unit into a high bandwidth channel for service.

When service requests are made simultaneously, the system needs to decide which input port to service. The decision has to be made such that the service requests can be accommodated at reasonable response time to avoid overflow at the buffers, resulting in loss of data. In practical systems, the endpoints to lower bandwidth channels and the higher bandwidth multiplexing unit may be physically located on separate devices, and no or little information is available to allow the multiplexing circuit to make an informed decision resolving multiple requests.

Existing techniques to resolve multiple requests include time division multiplexing, weighed round robin, and priority-based schemes. However, these techniques are inadequate because the amount of data carried by the input channels at a given time may vary considerably.

Therefore, there is a need in the technology for a technique to process multiple requests.

BRIEF DESCRIPTION OF THE DRAWINGS

The features and advantages of the present invention will become apparent from the following detailed description of the present invention in which.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
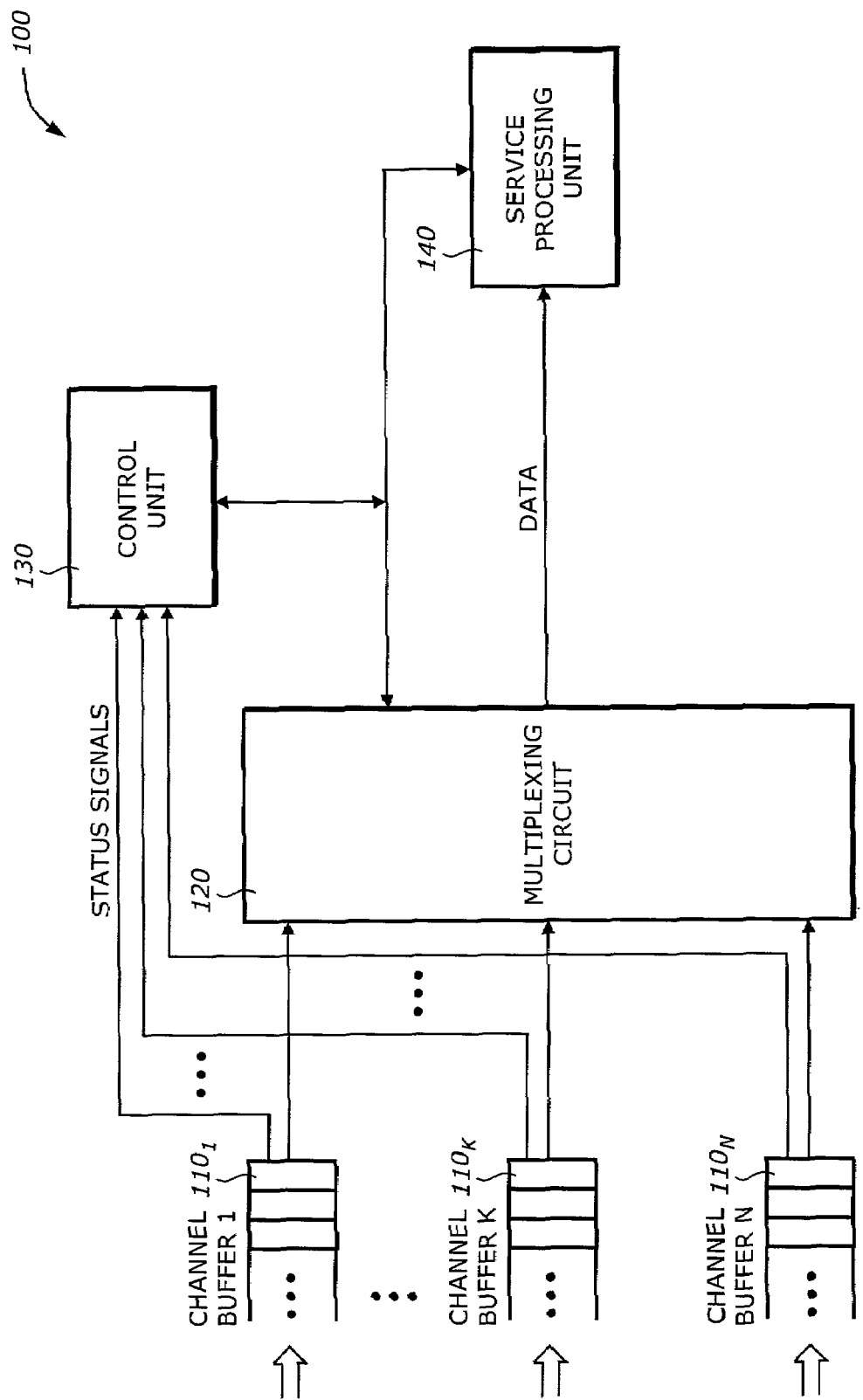
FIG. 1 is a diagram illustrating a system in which one embodiment of the invention can be practiced.

FIG. 1 is a diagram illustrating a system 100 in which one embodiment of the invention can be practiced. The system 100 includes N channel buffers $110_1$ to $110_N$, a multiplexing circuit 120, a control unit 130, and a service processing unit 140. These circuits may be located in the same device or separate devices. The signals, including the data, may be fed in parallel or serial form. The data may be from any communication system. In one embodiment, the data may be compatible with the Universal Test & Operations PHY Interface for Asynchronous Transfer Mode (ATM) (UTOPIA) data path interface, as described in the document titled "Utopia Level 2, version 1.0", June 1995, provided by the ATM Forum. "UTOPIA 3 Physical Layer Interface", November 1999, provided by the ATM Forum, and "POS-PHY, Saturn Compatible Packet Over Sonet Interface Specification for Physical Layer Devices (Level 2)", December 1998, provided by the Saturn Group, PMC-Sierra. The system 100 may be configured to be used in Multi-PHY (MPHY) operation having data rates of 155 Mbps (for less than or equal to 8 PHY devices) or 622 Mbps (for less than or equal to 4 PHY devices).

The N channel buffers $110_1$ to $110_N$ store data arriving from a communication receiver to be serviced by the service processing unit 140. Each of the N channel buffers $110_1$ to $110_N$ corresponds to an input port of the receiver. The data may arrive at the input ports at different arrival rates or bandwidths. Each of the N channel buffers $110_1$ to $110_N$ has sufficient depth to store data. When the data rates are known in advance and are approximately constant, the service processing unit 140 can be designed to handle these data accordingly. Other techniques such as the weighted round robin scheme may also be used. However, when the data rates are not known in advance, or when data arrive in bursts (e.g., variable data rates), and the service processing unit 140 does not service fast enough, the corresponding channel buffer may be overflowed, resulting in loss of data. The technique of the present invention provides an adaptive control scheme based on statistical multiplexing that prevents such an overflow. As will be explained later, the sum of the input rates may be greater than the output rate, but the statistical multiplexing is able to service the input ports because the input rates vary and not all input channels are at their maximum rates at the same time. The channel buffer may be implemented by any suitable storage devices such as standard random access memories or first-in-first-out (FIFO). Each of the channels also has a status to indicate if the data is ready for being serviced. These status signals are provided to the control unit 130. They can be polled or used as interrupt signals to interrupt a processor or device in the control unit 130. When data are ready to be serviced, this status signal, which may be implemented by a flag in a storage element (e.g., register, flip-flops), is asserted. When a channel buffer is empty indicating that all data have been read out and serviced, its status signal is negated.

The multiplexing circuit 120 multiplexes the N channel buffers $110_1$ to $110_N$ at a multiplexing rate to send the data read from the N channel buffers $110_1$ to $110_N$ to the service processing unit 140. The rate of multiplexing may be constant or variable under the control of the control unit 130. The multiplexing circuit 120 multiplexes the data reading out of the N channel buffers $110_1$ to $110_N$ based on the concept of statistical multiplexing. Statistical multiplexing exploits the observation that the amount of data carried by the input channels at a given time may vary considerably, and is rarely at maximum capacity. Maximum bandwidth utilization of the input channels may be considered statistically independent events. Because it is unlikely that all input channels are fully utilized at a single instant, the input channels can be aggregated with a total bandwidth higher than the bandwidth that the multiplexing circuit 120 and the service processing unit 140 can actually support. The challenge this provides to the multiplexing circuit 120 is that the servicing requirements of input ports cannot be predetermined as required by the commonly known time division multiplexing, weighted round robin, or priority-based schemes. The multiplexing circuit 120 selects the channel to be serviced and pass the data read out from the buffers to the service processing unit 140. When multiple status signals are asserted indicating that the data at multiple channels are ready, the multiplexing circuit 120 retrieves data from the channel selected by the control circuit 130.

The control unit 130 monitors the N channel buffers $110_1$ to $110_N$ via the status signals and selects the channel to be serviced according to an adaptive control scheme. The status signals may be polled or used as interrupt signals to interrupt the control unit 130. In essence, when there are multiple ports ready to be serviced, the control unit 130 selects the port that was most recently serviced. By using this criteria, the control unit 130 is able to select the port with very high data rates. Relatively high bandwidth ports do not monopolize the service processing unit 140 because once selected, their buffers are drained at the much higher bandwidth aggregated output rate by the multiplexing circuit 120. If any port is selected over and over, its buffer quickly becomes completely empty. Such a port will not be selected next time because its status signal will be negated. Therefore, slower input ports will have a chance to be serviced. The control unit 130 has a number of handshake signals with the service processing unit 140.

The service processing unit 140 services the input ports as selected by the control unit 130. The service processing unit 140 may perform any necessary functions to process the data.

Figure 2:
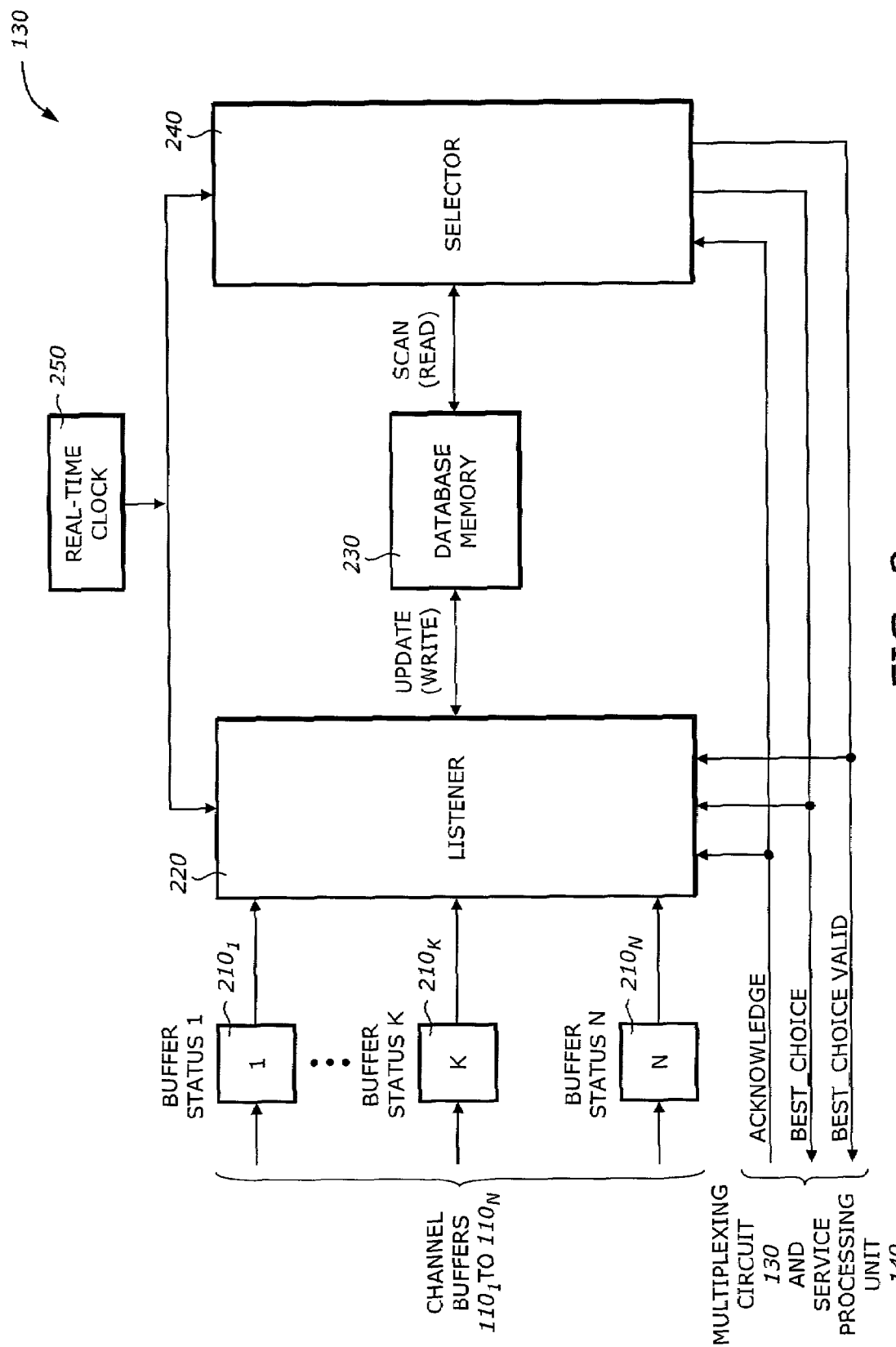
FIG. 2 is a diagram illustrating a control unit shown in FIG. 1 according to one embodiment of the invention.

FIG. 2 is a diagram illustrating the control unit 130 shown in FIG. 1 according to one embodiment of the invention. The control unit 130 includes N buffer status indicators or signals $210_1$ to $210_N$, a listener 220, a database memory 230, a selector 240, and a real-time clock 250.

The N buffer status indicators or signals $210_1$ to $210_N$ indicate the status of the N channel buffers $110_1$ to $110_N$ (FIG. 1). The status signal indicates if the input port is ready to be serviced. Typically, this indicates that the data has arrived at the corresponding channel buffer, or at a certain depth that needs to be serviced. Each status indicator may assume one of two states: ready and not ready. The status indicator is asserted when the input port is ready and negated when the input port is not ready. In one embodiment, each of the N buffer status indicators or signals $210_1$ to $210_N$ is implemented as a one-bit flag stored in a flip-flop, a register, or a memory location.

Figure 3:
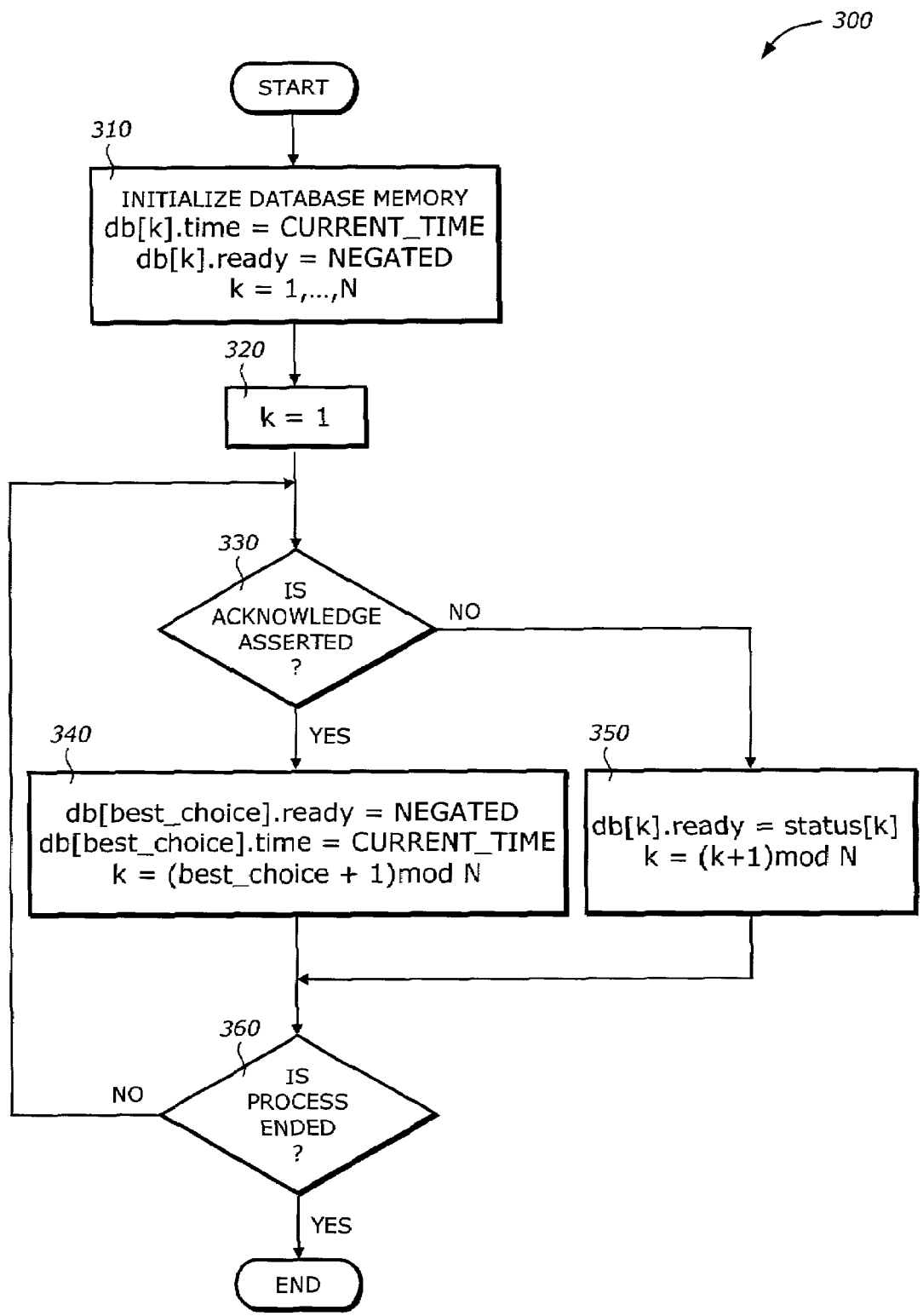
FIG. 3 is a flowchart illustrating a listening process according to one embodiment of the invention.

The listener 220 listens to the N buffer status indicators or signals $210_1$ to $210_N$ and updates the database memory 230 according to the information received from the selector 240. As will be described later, the database memory 230 stores a timestamp and ready status for each of the input ports. The listener 220 receives an acknowledge signal from the service processing unit 140 indicating that a selected input port has been serviced. The listener 220 also receives the best_choice and best_choice_valid signals from the selector 240. The best_choice signal indicates the input port selected by the selector 240. The value of the best_choice signal is from 1 to N where N is the number of input ports. The best_choice_valid signal indicates that the input port information of the best_choice signal is valid. The listener 220 has read and write circuitry to update the input port information in the database memory 230. The listener 220 also receives real-time clock information from the real-time clock 250. FIG. 3 illustrates a flowchart for the listening process.

When the listener 220 receives an asserted acknowledgment signal, it sets the timestamp of the selected input port, i.e., the input port best_choice, to the current time and negates the ready status of the selected input port because that input port has already been serviced. When the listener 220 receives a negated acknowledgment signal or does not find the acknowledgment signal asserted, it updates the ready status of the input ports from the N buffer status indicators or signals $210_1$ to $210_N$.

The database memory 230 stores records of the N input ports having the N channel buffers $110_1$ to $110_N$ (FIG. 1). Each of the records includes a timestamp and a status of a corresponding input port. The timestamp indicates a most recent service time of the input port. An input port k has a timestamp db[k].time and a ready status db[k].status. The db[k].time is the time at which the input port k is serviced. The database memory 230, therefore, keeps track of the most recent time the input port k is serviced. The db[k].ready is the status of the input port k. When the db[k].ready is asserted, the input port k is ready to be serviced. When the db[k].ready is negated, the input port k is not ready for service. Initially, the db[k].time and the db[k].ready are initialized with the current time as provided by the real-time clock 250 (FIG. 2) and negated status. The database memory 230 may be implemented as a regular RAM or a dual-ported RAM that allows simultaneous read and write.

The selector 240 selects the input port to be serviced. The selector 140 reads or scans the input port information or records from the database memory 230. The selector 240 receives the acknowledgment signal as part of handshake signals with the service processing unit 140. The selector 240 generates a best_choice signal and a best_choice_valid signal to the listener 220 and the service processing unit 140. The best_choice signal indicates the port to be serviced as determined by the selector 240. The best choice_valid signal indicates if the information on the best_choice signal is valid. The selector 240 receives the real-time clock information from the real-time clock 250.

The selector 240 goes through all the records of the input ports as constantly updated by the listener 220. When an input port is not ready and there is no acknowledgement, the selector 240 continues to go to the next input port. When there is only one input port with asserted ready status, the selector 240 selects that input port for service. When there are multiple input ports with ready status, the selector 240 selects the input port having the highest most recent service time, i.e., the service time that is closest to the current time among all the most recent service times of the input ports. Then, the selector 240 sends the best_choice signal indicating the selected input port to the listener 220 so that the listener 220 can update the timestamp of the input port best_choice to the current time and the corresponding status.

The real-time clock 250 is a timing device that generates real-time clock information. The real-time clock information is not necessarily the wall clock, but may be any real-time timing information with respect to some timing reference. The real-time clock 250 provides the timing information to the listener 220 and the selector 240.

For best performance, the control portion of the control unit 130 (e.g., control hardware or software) needs to run as fast as possible. The faster the listener 220 can scan the buffer status and the faster the selector 240 can scan the database memory 230, the faster the system can react to sudden changes in the port rates.

FIG. 3 is a flowchart illustrating a listening process 300 according to one embodiment of the invention.

Upon START, the process 300 initializes the temporary registers, variables, and the records in the database memory 230 (Block 310). The two main elements of the records are the time and the ready status as indicated by the db[k].time and db[k].ready data structures. Initially, or at device reset, all the input ports have the current time timestamp and negated status, i.e., db[k].time=current time, and db[k].ready=negated, for k=1, . . . , N. Next the process 300 starts the listening of the status signals as the multiplexing circuit multiplexes through all the input ports from 1 to N, and repeats the cycle continuously until terminated by some termination condition. The process 300 starts with the first input port k=1 (Block 320).

Then, the process 300 determines if the acknowledge signal is asserted (Block 330). If so, the process 300 obtains the best_choice signal and updates the record of the input port best_choice and then go to the next input port from the input port best choice (Block 340). This is accomplished by negating the ready status of the input port best_choice, and setting the timestamp of the input port best_choice to the current time. If the acknowledgement signal is negated, the process 300 obtains the ready status of the input port k and go to the next input port from k (Block 350).

Next, the process 300 determines if the listening is terminated according to some termination condition (Block 360). If not, the process 300 goes back to block 330 to continuously monitor the input ports. Otherwise, the process 300 is terminated.

Figure 4:
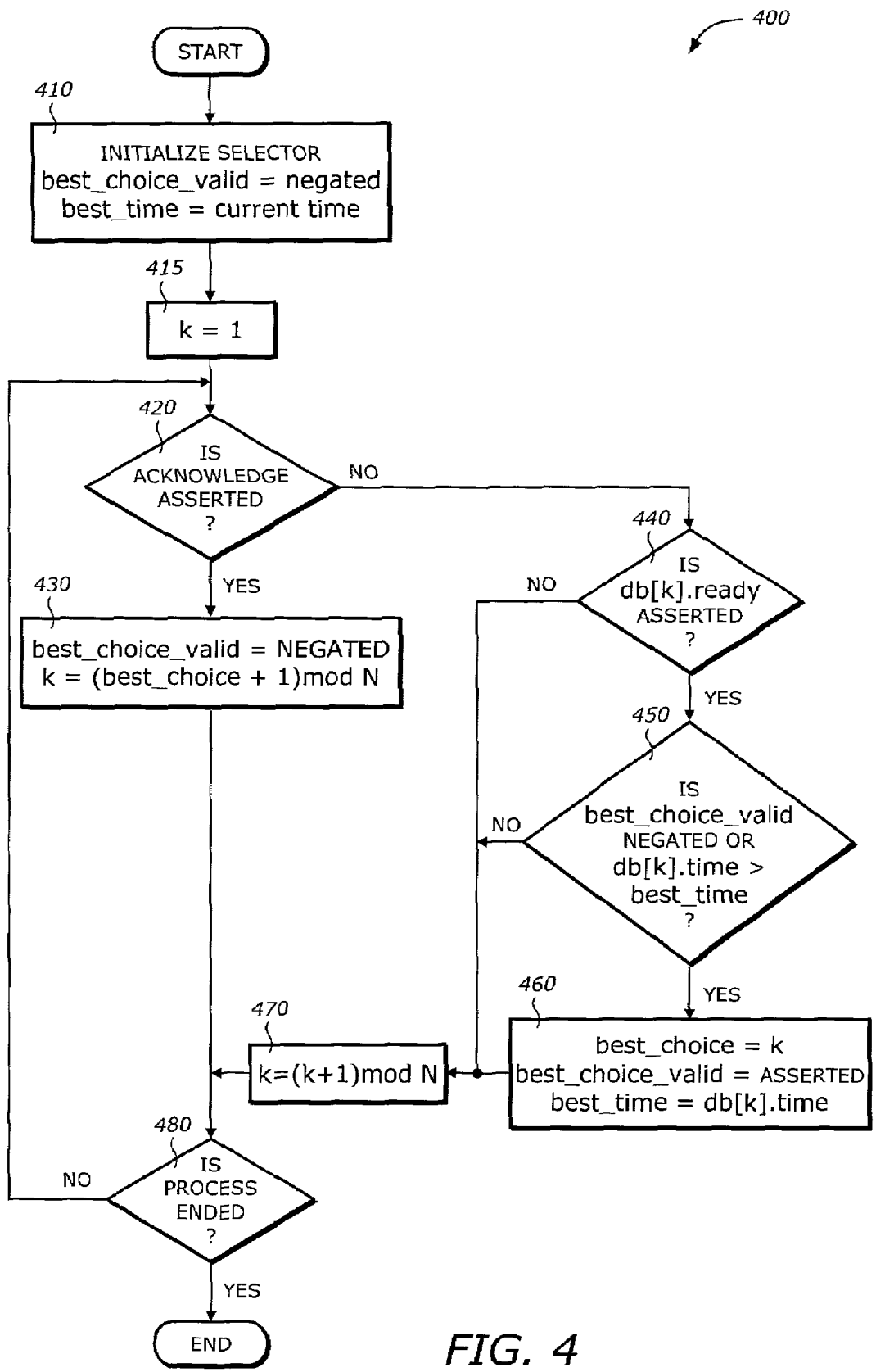
FIG. 4 is a flowchart illustrating a selection process according to one embodiment of the invention.

FIG. 4 is a flowchart illustrating a selection process 400 according to one embodiment of the invention.

Upon START, the process 400 initializes the temporary storage and/pr variables (Block 410). The temporary variables are best_time and best_choice_valid. Initially, the best_time is set to the current time as provided by the real-time clock, and the best_choice _valid is negated. Then, the process 400 starts the continuous selection of input ports. The process 400 starts with the first input port (Block 415).

Next, the process 400 determines if the acknowledgment signal is asserted (Block 420). If so, the process 400 negates the best_choice_valid signal and go to the next input port from the input port best_choice (Block 430), and then goes to Block 480. If the acknowledgement signal is not asserted, the process 400 determines if the ready status of the input port k is asserted (Block 440). If not, the process 400 goes to Block 470 to go to the next input port. Otherwise, the process 400 determines if the best_choice_valid is negated or the timestamp of the input port k is greater than the best _time (Block 450). If no, the process 400 goes to Block 470 to go to the next input port. Otherwise, the process 400 updates the best_choice to the input port k, asserts the best_choice_valid, and sets the best_time to the timestamp of the input port k (Block 460), Next, the process 400 goes to the next port from the input port k (Block 470). Then, the process 400 determines if the selection is terminated according to some termination condition (Block 480). If not, the process 400 goes back to Block 420 to continue. Otherwise, the process 400 is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a database to store records of input ports for a plurality of communication channels, each of the records including a timestamp and a ready status, the timestamp indicating a most recent service time;
   a selector coupled to the database and configured to select one of the input ports based on the timestamp corresponding to a highest most recent service time, which is closest to the current time, and the ready status; and
   a listener coupled to the database and the selector and configured to update the records.

2. The apparatus of claim 1 wherein the database is configured to assert the ready status when the corresponding input port is ready to be serviced and to negate the ready status when the corresponding input port is not ready to be serviced.

3. The apparatus of claim 2 wherein the selector is configured to select the one of the input ports having asserted ready status with all other input ports having negated ready status.

4. The apparatus of claim 2 wherein the selector is configured to select the one of the input ports with asserted ready status.

5. The apparatus of claim 1 wherein the listener is configured to update the ready status of each of the input ports.

6. The apparatus of claim 1 wherein the listener is configured to negate the ready status of the selected input port after the selected input port is serviced.

7. The apparatus of claim 1 wherein the listener is configured to set the timestamp of the selected input port to current time after the selected input port is serviced.

8. A method comprising
   storing records of input ports for a plurality of communication channels in a database, each of the records including a timestamp and a ready status, the timestamp indicating a most recent service time;

selecting one of the input ports based on the timestamp corresponding to a highest most recent service time, which is closest to the current time, and the ready status; and updating the records.

9. The method of claim 8, further comprising:
asserting the ready status when the corresponding input port is ready to be serviced; and
negating the ready status when the corresponding input port is not ready to be serviced.

10. The method of claim 9 wherein the selecting comprises selecting the one of the input ports having asserted ready status with all other input ports having negated ready status.

11. The method of claim 9 wherein the selecting comprises selecting the one of the input ports with asserted ready status.

12. The method of claim 8 wherein the updating comprises updating the ready status of each of the input ports.

13. The method of claim 8 wherein the updating comprises negating the ready status of the selected input port.

14. The method of claim 8 wherein the updating comprises setting the timestamp of the selected input port to current time.

15. A system comprising:
a plurality of channel buffers corresponding to a plurality of input ports;
a multiplexer circuit coupled to the channel buffers to select one of the channel buffers; and
a control circuit coupled to the multiplexer circuit to control selection of the one of the channel buffers, the control circuit comprising:
  a database configured to store records of the input ports, each of the records including a timestamp and a ready status, the timestamp indicating a most recent service time,
  a selector coupled to the database and configured to select one of the input ports based on the timestamp corresponding to highest most recent service time, which is closest to the current time, and the ready status, and
  a listener coupled to the database and the selector and configured to update the records.

16. The system of claim 15 wherein the database is configured to assert the ready status when the corresponding input port is ready to be serviced and to negate the ready status when the corresponding input port is not ready to be serviced.

17. The system of claim 16 wherein the selector is configured to select the one of the input ports having asserted ready status with all other input ports having negated ready status.

18. The system of claim 16 wherein the selector is configured to select the one of the input ports with asserted ready status.

19. The system of claim 15 wherein the listener is configured to update the ready status of each of the input ports.

20. The system of claim 15 wherein the listener is configured to negate the ready status of the selected input port.

21. The system of claim 15 wherein the listener is configured to set the timestamp of the selected input port to current time.

22. A non-transitory processor readable medium having stored thereon computer-executable instructions, execution of which, by a computing device, cause the computing device to perform operations comprising:
storing records of input ports for a plurality of communication channels in a database, each of the records including a timestamp and a ready status, the timestamp indicating a most recent service time;

selecting one of the input ports based on the timestamp corresponding to a highest most recent service time, which is closest to the current time, and the ready status; and updating the records.

23. A system comprising:
a record input configured to receive one or more records corresponding to one or more channels, each of the records comprising a timestamp and a ready status, the timestamp indicating a most recent service time;
a selector configured to select one of the channels for servicing based on the timestamp corresponding to a highest most recent service time, which is closest to the current time, and the ready status; and
a selection output configured to provide a selection signal indicating the selected one of the channels.

24. The system of claim 23, wherein the ready status is asserted when the corresponding channel is ready to be serviced and negated when the corresponding channel is not ready to be serviced.

25. The system of claim 24, wherein the selector is further configured to select the one of the channels having asserted ready status with all other channels having negated ready status.

26. The system of claim 24 wherein the selector is configured to select the one of the channels with asserted ready status.

27. The system of claim 23 wherein the record input is further configured to receive an updated ready status of each of the channels.

28. The system of claim 23, wherein the selector is configured to select the one of the channels for servicing based first on the ready status and based second on the timestamp corresponding to the highest most recent service time.

29. A method comprising:
receiving one or more records corresponding to one or more channels, each of the records comprising a timestamp and a ready status, the timestamp indicating a most recent service time;
selecting, in a selector device, one of the channels for servicing based on the timestamp corresponding to a highest most recent service time, which is closest to the current time, and the ready status; and
providing a selection signal indicating the selected one of the channels.

30. The method of claim 29, wherein the ready status is asserted when the corresponding channel is ready to be serviced and negated when the corresponding channel is not ready to be serviced.

31. The method of claim 30, further comprising:
selecting the one of the channels having asserted ready status with all other channels having negated ready status.

32. The method of claim 30, further comprising:
selecting the one of the channels with asserted ready status.

33. The method of claim 29, further comprising:
receiving an updated ready status of each of the channels.

34. The method of claim 29, further comprising:
selecting the one of the channels for servicing based first on the ready status and based second on the timestamp corresponding to the highest most recent service time.

35. A non-transitory processor readable medium having stored thereon, computer executable instructions, execution of which, by a computing device, cause the computing device to perform operations comprising:

receiving one or more records corresponding to one or more channels, each of the records comprising a timestamp and a ready status, the timestamp indicating a most recent service time;

selecting, in a selector device, one of the channels for servicing based on the timestamp corresponding to a highest most recent service time, which is closest to the current time, and the ready status; and providing a selection signal indicating the selected one of the channels.

* * * * *